US006854007B1

(12) United States Patent
Hammond

(10) Patent No.: US 6,854,007 B1
(45) Date of Patent: Feb. 8, 2005

(54) METHOD AND SYSTEM FOR ENHANCING RELIABILITY OF COMMUNICATION WITH ELECTRONIC MESSAGES

(75) Inventor: Nancey J. Hammond, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/153,994

(22) Filed: Sep. 17, 1998

(51) Int. Cl.[7] .............................................. G06F 15/16

(52) U.S. Cl. ........................ 709/206; 709/207; 719/313

(58) Field of Search ......................... 719/313; 709/206, 709/207, 200, 313, 310, 204

(56) References Cited

U.S. PATENT DOCUMENTS

| 4,962,532 A | * | 10/1990 | Kasiraj et al. | 713/166 |
| 5,057,935 A | * | 10/1991 | Williams | 358/402 |
| 5,325,310 A | * | 6/1994 | Johnson et al. | 709/206 |
| 5,396,537 A | * | 3/1995 | Schwendeman | 340/7.23 |
| 5,487,100 A | * | 1/1996 | Kane | 340/7.23 |

(List continued on next page.)

FOREIGN PATENT DOCUMENTS

| JP | 04282934 A | * | 10/1992 | H04L/12/54 |
| JP | 08130554 A | * | 5/1996 | H04L/12/54 |
| JP | 11252164 A | * | 9/1999 | H04L/12/54 |

OTHER PUBLICATIONS

Fulton, Jennifer et al. "Netscape Navigator 6 in 1". Que Corporation. 1996. p. 177–188.*
Cox, Nancy. "Messaging's next blockbuster hit". Computer Select, Apr. 15, 1997.*
Microsoft. "Messaging Client API". MAPI Version 1.0. Apr. 15, 1992.*
Drummond, Rik. "Save and secure electronic commerce." Computer Select. Dec. 1, 1996.*
Moore, K. "An Extensible Message Format for Delivery Status Notification." RFC 1894. Jan. 1996.*
Fleming, S.T. "Electronic mail: case study in task–oriented restructuring of application domain." IEEE, Mar. 1994.*

(List continued on next page.)

Primary Examiner—Lewis A. Bullock, Jr.
(74) Attorney, Agent, or Firm—Dorsey & Whitney LLP

(57) ABSTRACT

A system for enhancing the reliability of communicating with electronic messages. The system sends an electronic message to designated recipients, and then automatically helps ensure that each message has been successfully delivered within a specified period of time and that each message has been reviewed within a specified period of time. In addition, the system automatically performs specified activities after review of a message takes place. The sender of an electronic message initiates reliability-enhanced messaging by specifying message delivery information and message review information. The sender can specify that if delivery or review notifications are not received within specified periods of time, the message will be resent to the recipient or a reminder message will be sent to the recipient or to another user. The message information can include various frequency and duration options, such as resending a message only once or resending it every 2 hours for a week. Message information can also specify to resend the message with a higher transmission priority or review urgency so that its delivery and review is more likely, or could specify to use a different recipient system for the recipient (e.g., to a second email address if a first address fails, or to a pager if a cellular phone is not available). Each recipient of a message can have individualized message delivery information. The system tracks whether each message has been delivered to each recipient, and uses the message delivery information to resend the messages whose delivery and review was not confirmed.

96 Claims, 7 Drawing Sheets

U.S. PATENT DOCUMENTS

| | | | | |
|---|---|---|---|---|
| 5,740,231 A | * | 4/1998 | Cohn et al. | 370/401 |
| 5,742,668 A | * | 4/1998 | Pepe et al. | 455/415 |
| 5,764,899 A | * | 6/1998 | Eggleston et al. | 709/203 |
| 5,790,639 A | * | 8/1998 | Ranalli et al. | 358/407 |
| 5,793,973 A | * | 8/1998 | Birdwell et al. | 709/223 |
| 5,819,110 A | * | 10/1998 | Motoyama | 710/15 |
| 5,842,195 A | * | 11/1998 | Peters et al. | 707/1 |
| 5,893,099 A | * | 4/1999 | Schreiber et al. | 707/10 |
| 5,923,848 A | * | 7/1999 | Goodhand et al. | 709/219 |
| 5,930,471 A | * | 7/1999 | Milewski et al. | 709/204 |
| 5,940,823 A | * | 8/1999 | Schreiber et al. | 707/200 |
| 5,978,836 A | * | 11/1999 | Ouchi | 709/203 |
| 6,002,852 A | * | 12/1999 | Birdwell et al. | 709/203 |
| 6,038,601 A | * | 3/2000 | Lambert et al. | 709/226 |
| 6,108,688 A | * | 8/2000 | Nielsen | 709/206 |
| 6,108,709 A | * | 8/2000 | Shinomura et al. | 709/228 |
| 6,157,945 A | * | 12/2000 | Balma et al. | 709/206 |
| 6,175,859 B1 | * | 1/2001 | Mohler | 709/206 |
| 6,185,603 B1 | * | 2/2001 | Henderson et al. | 709/206 |
| 6,208,996 B1 | * | 3/2001 | Ben-Shachar et al. | 345/963 |
| 6,272,532 B1 | * | 8/2001 | Feinleib | 709/206 |
| 6,314,454 B1 | * | 11/2001 | Wang et al. | 709/206 |
| 6,327,046 B1 | * | 12/2001 | Miyamoto et al. | 358/1.15 |
| 6,370,567 B1 | * | 4/2002 | Ouchi | 709/206 |
| 6,427,164 B1 | * | 7/2002 | Reilly | 709/206 |
| 6,453,341 B1 | * | 9/2002 | Miloslavsky | 709/206 |
| 6,603,389 B1 | * | 8/2003 | Murray | 340/7.2 |
| 6,618,747 B1 | * | 9/2003 | Flynn et al. | 709/206 |
| 2002/0055898 A1 | * | 5/2002 | Burakoff et al. | 705/35 |
| 2002/0144154 A1 | * | 10/2002 | Tomkow | 713/201 |

OTHER PUBLICATIONS

"Conferencing Tools," http://www.cio.com/WebMaster/wm_conferencing.html, p. 1 [Accessed Jan. 22, 1998].

"What is HyperNews?,"http://www.cer.ch/WebOfficialDoc/HyperNews/WhatIsHN.html, pp. 1–4 [Accessed Jan. 22, 1998].

"The Right Work Environment for Network–Centric Computing," http://esuite.lotus.com/eSuite/eSuite_Site.nsf/b9160abf61cf14e38525653b006a4e99/2d227cfb1f91d8dc85256541002254, p. 1 [Accessed Jan. 22, 1998].

"Project Cyrus: Overview of Technologies Chosen," http://andrew2.andrew.cmu.edu/cyrus/cyrustechoverview.fm.html, pp. 1–2 [Accessed Jan. 22, 1998].

"Multiple–reply 'SPAR' Service," DataBack Systems, http://www2.databack.com/mailback/multispar.htm, pp. 1–2 [Accessed Jan. 28, 1998].

"Conferencing Systems," Collaborative Conferencing, http://www.hypernews.org/HyperNews/get/www.collab/conferencing.html, pp. 1–4 [Accessed Jan. 22, 1998].

"AutoResponder/AutoMailer/Autobot Comparisons," http://www.makura.com/auto/autocomp.html, pp. 1–18 [Accessed Jan. 28, 1998].

"Lotus cc:Mail Release 8.1," http://www.ccmail.com/overview/r81specsheet.htm, pp. 1–3 [Accessed Jan. 22, 1998].

"Lotus cc:Mail Technical Overview," http://www.ccmail.com/overview/overview.htm, pp. 1–43 [Accessed Jan. 22, 1998].

"GroupWise 5: Detailed Information," Novell GroupWise 5 Product Details, http://www.sisnema.com.br/novell/ngw5/ngw5.1/informativo/infoing.htm, pp. 1–9 [Accessed Jan. 28, 1998].

* cited by examiner

Message Tracking Table

| Row/Column | 1 Message ID | 2 Recipient ID | 3 Send Time | 4 Delivery Time | 5 Review Time | 6 Resend Time Period | 7 Review Reminder Time Period | 8 Post-Review Time Period |
|---|---|---|---|---|---|---|---|---|
| 1 | 1 | ABC | 07/26/XX 18:26:33 | 07/26/XX 18:28:15 | 07/28/XX 10:12:33 | 1 hour | 1 day | 1 hour |
| 2 | 1 | BCD | 07/26/XX 18:26:33 | 07/27/XX 00:15:12 | 07/27/XX 11:33:37 | 2 hours | 18 hours | |
| 3 | 2 | CDE | 07/28/XX 10:05:10 | | 07/30/XX 09:08:13 | | 2 days | 1 day |
| 4 | 3 | ABC | 08/10/XX 09:10:13 | 08/10/XX 09:10:17 | | 1 minute | | |
| ⋮ | | | | | | | | |

Message Tracking Table (continued)

| Row/Column | 9 Resend Record | 10 Review Reminder Record | 11 Post-Review Record | 12 Resend Options | 13 Review Reminder Options | 14 Post-Review Options |
|---|---|---|---|---|---|---|
| 1 | | 07/27/XX 18:30:10 | 07/28/XX 11:13:00 | High Priority | High Urgency | Message Y |
| 2 | 07/26/XX 20:26:45<br>07/26/XX 22:28:13 | | | Max 3 times | Template X | |
| 3 | | | 07/31/XX 09:10:00<br>08/01/XX 09:10:10 | | Supervisor | Template R<br>Template S |
| 4 | | | | | | |
| ⋮ | | | | | | |

*Fig. 2*

METHOD AND SYSTEM FOR ENHANCING RELIABILITY OF COMMUNICATION WITH ELECTRONIC MESSAGES

TECHNICAL FIELD

The present invention relates generally to communicating via electronic messages, and more particularly to enhancing the reliability of the communication.

BACKGROUND OF THE INVENTION

Electronically-communicated messages ("electronic messages") such as email, paging messages, and voice mail have become increasingly popular and pervasive in recent years. For the creator of an electronic-message, the ability to send the message to one or more recipients provides for quick and efficient communication. Such communication via electronic messages has become common in both business and personal settings.

While the initial distribution of electronic messages by a sender is quick and convenient, ensuring that an electronic message is delivered (i.e., received by the recipient) and reviewed (e.g., reading an email or paging text, viewing an email image, listening to a voice mail message, etc.) within a certain time frame is not convenient. Due to the asynchronous nature of most electronic message transmission systems, immediate feedback is not provided as to whether the electronic message has been reliably received by each of the recipients. Some transmission systems provide a facility such that if an error is detected by a sending system (e.g., a recipient system is currently unavailable at the time of sending, the sending system may attempt to resend the electronic message. In such systems, if the error reoccurs, the transmission system typically notifies the sender that delivery failed. Thus, the sender receives no indication that message delivery problems exist until after an amount of time, which can be lengthy, has elapsed. In other transmission systems, the sender will receive no notification even if the delivery of the electronic message fails.

Moreover, even if the delivery of an electronic message to a recipient is successful, it if often important that the recipient review the electronic message within a certain amount of time. Transmission systems typically do not provide a mechanism to reliably ensure that a recipient has reviewed a successfully delivered message. A few transmission systems allow the sender to request notification when an electronic message is received by a recipient and when it is accessed (e.g., opened by an application program with which the recipient can review the message) by the recipient. In some such systems, the recipient's system will provide to the sender's system a delivery receipt or a review receipt to provide notification when delivery or review of an electronic message has occurred. Thus, if a review receipt has not yet been received, then the recipient may not have reviewed the electronic message. However, the sender has no automatic means of prompting or convincing the recipient to review the electronic message. Finally, if it desirable that some action be automatically performed after a recipient has reviewed an electronic message (e.g., sending a follow-up message), there is no automatic means of providing this functionality.

SUMMARY OF THE INVENTION

Some embodiments of the present invention provide a method and system for enhancing the reliability of communicating with electronic messages. In particular, the system sends an electronic message to designated recipients, and then automatically helps ensure that each message has been successfully delivered and that each message has been reviewed. If the delivery or review of the electronic message has not been confirmed after a certain time period, the system can automatically resend the electronic message or take some other appropriate action. In addition, even if delivery or review has been confirmed, the system can automatically perform additional specified activities.

The system allows a sender of an electronic message to specify message tracking information, such as message delivery information and message review information, that specifies actions to take when a message is not delivered or not reviewed within a specified period of time. For example, the sender can specify that if a delivery notification is not received within a specified period of time, the message will be resent to the recipient. Alternately, if a review notification is not received within a specified period of time, the sender can specify that a reminder message be sent to the recipient or to another user (e.g., the recipient's supervisor or assistant). The message tracking information can include various frequency and duration options, such as resending a message only once or instead resending it every 2 hours for a week. In addition, message tracking information can specify to resend the message with a higher transmission priority or review urgency so that its delivery and review is more likely, or could specify to resend the message or send a reminder message to a different recipient system for the recipient (e.g., to a second email address if a first address fails, or to a pager if a cellular phone is not available).

The system also allows a sender of an electronic message to specify message tracking information that specifies actions to take after a message is successfully delivered or reviewed. For example, the sender can specify that a supervisor receive a confirmation when a recipient receives an electronic message and when the recipient reviews the message. Alternately, a recipient can be sent a follow-up message after review of a first electronic message. The message tracking information can include various frequency and duration options, such as sending confirmation messages immediately and sending follow-up messages after a specified period of time has elapsed since review of the original message.

In one embodiment, the sender can individualize the message delivery information for each recipient of a message, while in another embodiment the sender can use the same message delivery information for all recipients. The system tracks whether each message has been delivered and reviewed by to each recipient, and uses the message information to resend the messages whose delivery or review is not confirmed.

BRIEF DESCRIPTION OF THE DRAWINGS

FIG. 2 is an example of a Message Tracking Table.

DETAILED DESCRIPTION OF THE INVENTION

Figure 1:
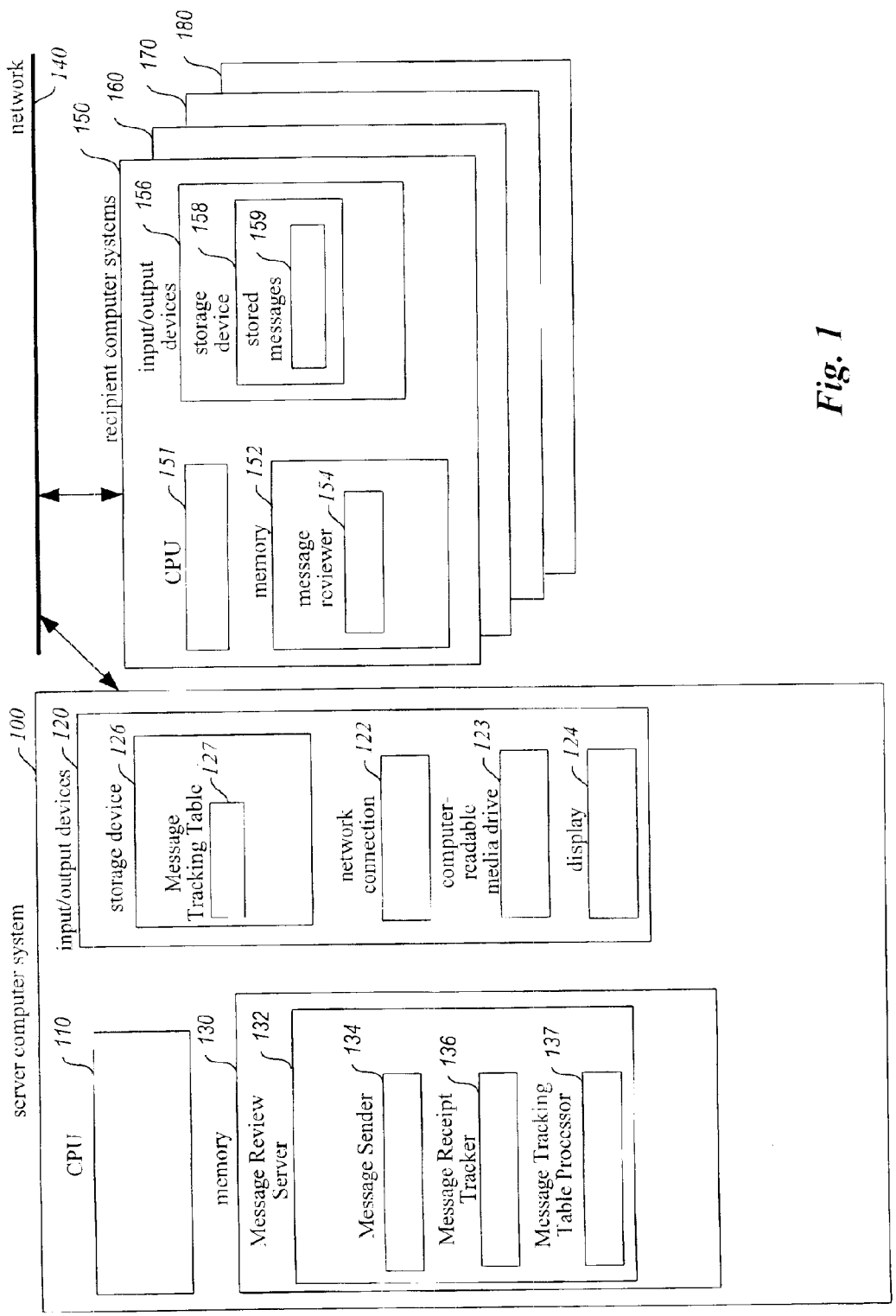
FIG. 1 is a block diagram illustrating an embodiment of the Message Review Server system of the present invention.

An embodiment of the present invention provides a method and system for enhancing the reliability of communicating with electronic messages. In particular, the Message Review Server (MRS) system sends an electronic message to designated recipients, and then automatically helps ensure that each message has been successfully delivered and that each message has been reviewed. If the delivery or review of the electronic message has not been confirmed after a certain time period, the system can automatically resend the electronic message or take some other appropriate action. In addition, even if delivery or review has been confirmed, the MRS system can automatically perform additional specified activities.

The MRS system allows the sender of an electronic message to specify message delivery information that specifies actions to take when a message is not delivered within a specified period of time. For example, the sender can specify that if a delivery notification is not received within a specified period of time, the message will be resent to the recipient. The message delivery information can also include various frequency and duration options, such as resending the message only once or instead resending it every 2 hours for a week in addition, message delivery information could indicate to resend the message with a higher transmission priority so that successful delivery is more likely, or could indicate to resend the message to a different recipient system for the recipient (e.g., to a second email address if a first address fails, or to a pager if a cellular phone is not available). The MRS system tracks whether each message has been delivered to each recipient, and uses the message delivery information to resend the messages whose delivery was not verified to be successful.

The message delivery information can be specified at the time of sending the original message, or in some embodiments, even after the message has been sent. In one embodiment, each recipient of a message can have individualized message delivery information, while in another embodiment all recipients of a message will share the same message delivery information. In addition, the MRS system can store such message delivery information in a variety of ways. For example, such information could be stored with the message (e.g., as a header or as attributes of a message object). Alternately, message delivery information can be stored in a Message Tracking Table accessible by the MRS system.

The MRS system also allows a sender of a message to specify message review information that specifies actions to take when a message is not reviewed within a specified period of time. As with the message delivery information, this information can be specified in some embodiments at the time of sending the message and in other embodiments at later times, and in some embodiments message review information is specified individually for each recipient while in other embodiments the information is specified uniformly for all recipients of a message. To enhance the likelihood that the message is timely reviewed by a recipient, the sender can specify a time period after which a reminder message will be sent if the sender has not been notified within that time period that the recipient has reviewed the message. This reminder message can have a variety of formats. For example, in one embodiment, the same message is resent to the recipient, but it is marked as being urgent and for immediate attention. In an alternate embodiment, a different message is sent to the recipient (e.g., a reminder to read the original message). In another embodiment, a message can be sent to an alternate recipient who can assist in ensuring that the original recipient review the original message (e.g., a supervisor of or an assistant to the original recipient). As with the original message, this reminder message can be reliably sent with the MRS system so as to enhance the reliability of its delivery and review.

After an electronic message has been delivered to or reviewed by a recipient, it may be desirable to have the MRS system automatically take various actions. For example, it may be desirable to automatically send one or more additional messages at specified periods after the message was delivered or reviewed. If the original message was to provide product information to a customer, an automatic follow-up message to the customer offering additional help or soliciting comments may be beneficial. Alternately, the original message may have been the first part in a multi-part series of messages (e.g., a serial novel), with later messages sent only after earlier messages have been reviewed. Thus, the sender can also specify message post-delivery and post-review information, including a time period after the delivery or review of the original message at the end of which a specified action is to be taken. For the specified action to be taken immediately, the time period can be set to zero.

Thus, the MRS system can automatically locate and resend an original message when delivery has not been confirmed, can automatically send one or more reminder messages to the recipient or to others to prompt the recipient to review the original message when review of the electronic message has not been confirmed; and can automatically perform additional activity when delivery or review of the original message has been confirmed.

FIG. 1 illustrates a server computer system 100 suitable for executing an embodiment of the Message Review Server (MRS) system, as well as recipient computer systems 150, 160, 170, and 180 suitable for receiving electronic messages transmitted by the MRS system. In the illustrated embodiment, the server computer system and recipient computer systems are connected via network 140, although any transmission medium (e.g., circuit-based telephone lines, packet-based computer lines, wireless RF, etc.) can be used for the transmission of the electronic messages. The server computer system includes a CPU 110, input/output devices 120, and a memory 130. The input/output devices include a storage device 126, a network connection 122, a computer-readable media drive 123, and a display 124, with a Message Tracking Table 127 stored on the storage device. The Message Review Server system 132 is executing in memory, and is composed of the Message Sender 134, Message Receipt Tracker 136, and Message Tracking Table Processor 137 components.

Use of the MRS system begins when a sender of an electronic message, such as a user of the server computer system or another computer attached to the network 140, supplies a message to the Message Sender component. In addition to supplying the message, the sender identifies one or more recipients for the electronic message, and can specify various optional message tracking information (i.e., message delivery information, message review information, and message post-review information). If the reliability of the delivery of the message to a recipient is to be enhanced, a sender will supply delivery information including a resend period of time and can optionally supply other resend options. If the reliability of the review of the message by a recipient is to be enhanced, the sender will supply review reminder information including a review reminder period of time and can optionally supply other review reminder options. Finally, if actions are to be taken after a recipient has reviewed the message, post-review information including a post-review period of time and post-review options can be supplied.

The Message Sender component collects the supplied message tracking information, sends the message to the specified recipients, and stores the message tracking information and the message send time in the Message Tracking Table. The Message Sender component also sets appropriate Resend timers (based on the delivery resend time period) and Review Reminder Timers (based on the Review Reminder Time period) for the recipients as indicated in the message tracking information supplied by the sender. Use of various timers will be explained in greater detail below. If different recipients of a message are to have different message tracking options, a separate entry in the Message Tracking Table will be created for each recipient of each message. Alternately, if all recipients of a message have the same message tracking options, a single entry in the Message Tracking Table can be created for the message.

The Message Receipt Tracker component attempts to identify when sent messages have been delivered to recipients and when sent messages have been reviewed by recipients. In one embodiment, the recipient computer systems provide receipts when messages are received and when messages are reviewed, and in this embodiment the Message Receipt Tracker is notified of these receipts. Alternately, the Message Receipt Tracker can periodically query a recipient to determine if the recipient has received and reviewed a message, or can monitor a recipient's activities to determine when the recipient accesses and reviews a message. After a message has been accessed, activities such as scrolling a text window or selecting text may indicate that the message is being reviewed, or movement of the recipient's eyes could indicate where attention is focused. After receiving notification of message delivery or review, the Message Receipt Tracker stores appropriate information from the notification in the Message Tracking Table (e.g., the time of delivery for a notification indicating that a message was delivered to a recipient and the time of review for a message that was reviewed by a recipient). After receiving a notification, the Message Receipt Tracker also resets any existing timers related to the notification (e.g., a Resend timer for a delivery notification or a Review Reminder Timer for a review notification). If a review notification is received, the Message Receipt Tracker also determines if the corresponding message and recipient have post-review activities specified, and if so sets an appropriate Post-Review timer.

The Message Tracking Table Processor component periodically reviews the information in the Message Tracking Table as well as the current timers to determine whether a specified tracking time period has expired, thus indicating a corresponding action needs to be taken. When a Resend timer has expired, the Message Tracking Table Processor uses the resend options specified for the one or more recipients (or uses default options if none have been specified) and resends the message to the one or more recipients. If a Review Reminder Timer has expired, the Message Tracking Table Processor uses the review reminder options to create a reminder electronic message to be sent, and then sends the message to one or more recipients as indicated by the options. Similarly, if a Post-Review timer has expired, the Message Tracking Table Processor performs the activities specified in the Post-Review options, such as sending a follow-up message to one or more recipients.

After sending a message in response to expiration of a time period, the Message Tracking Table Processor records the time of sending the message in an appropriate portion of the Message Tracking Table for the message and the one or more recipients. In addition, if it is appropriate to set another timer (e.g., if a message will continue to be resent until the MRS system is notified that it has been delivered to the recipients), a new timer with the appropriate time period is set. Alternately, if all required actions have been taken for a message and one or more recipients (e.g., notification has been received that the message has been reviewed and no Post-Review actions have been specified), the entry in the Message Tracking Table corresponding to the message and the one or more recipients is modified so that it is no longer checked by the Message Tracking Table Processor. In one embodiment, a flag is set in the entry, while in another embodiment the entry is removed from the Message Tracking Table. Those skilled in the art will appreciate that rather than using timers, an alternate embodiment can have the Message Tracking Table Processor calculate directly from information in the Message Tracking Table whether any action currently needs to be taken, such as by reviewing the specified time periods and the specified records (i.e., the send times for messages as well as the delivery and read times for the original message).

The recipient computer system 150 includes a CPU 151, a memory 152, and input/output devices 156, including a storage device 158. One or more stored messages 159 can be stored on the storage device, with the stored messages accessible corresponding to one or more users of the recipient computer system. A message reviewer 154 is executing in memory 152 to allow a user of the recipient computer system to review messages that have been received by the recipient computer system and stored in the stored messages. In an alternate embodiment, messages can be stored on the server computer system, and the message reviewer on a recipient computer system (e.g., a thin client) can retrieve the appropriate messages from the server computer system. In an embodiment in which notification of message delivery and message review is provided by recipient computer systems, the message reviewer or some other component on the recipient computer system can communicate this information to the server computer system.

Those skilled in the art will appreciate that computer systems 100 and 150 are merely illustrative and are not intended to limit the scope of the present invention. In particular, a recipient computer system can take on a variety of forms depending on the type of electronic message (e.g., a pager to receive paging messages, a personal computer system to receive email or voice mail messages, a telephone console to review voice mail messages, etc.). The computer systems may contain additional components or may lack some illustrated components, such as the server computer system including an appropriate transmission connection for the transmission method used (e.g., a network connection for email messages). In addition, those skilled in the art will appreciate that a singe server computer system may have more than one transmission method to transmit more than one type of electronic message. Accordingly, the present invention may be practiced with other computer system configurations.

As an illustrative example of a Message Tracking Table, consider Message Tracking Table 127 shown in FIG. 2. The illustrated Message Tracking Table contains entries for email electronic messages that are read by recipients, and each recipient of an email message can have unique message tracking information. Thus, a separate entry is created in the Message Tracking Table for each recipient of each message. In addition, entries are removed from the illustrated Message Tracking Table after all specified actions have been performed.

As is shown in rows 1 and 2 of the table, message 1 has been sent to recipients ABC and BCD. The Send Time column reflects the time that message 1 was originally sent by the Message Review Server to each of the recipients. As is shown by the Delivery Time column, notifications of delivery for each of the recipients has been received and recorded. Similarly, the Review Time column indicates that each of the recipients has reviewed message 1 at the time indicated. Row 1 indicates that the Resend time period, the Review Reminder Time period, and Post-Review time period are respectively set for recipient ABC as one hour, one day, and one hour. Conversely, the Resend time period and Review Reminder Time period for recipient BCD are respectively set to 2 hours and 18 hours, and the Post-Review time period is not specified.

Row 1 also indicates that message 1 was received by recipient ABC in less than the specified Resend Time period, and thus the Resend Record column does not contain any record of message 1 being resent to recipient ABC. If message 1 had been resent, the Resend Options column for row 1 indicates that the message would have resent with a high transmission priority. While the message was timely delivered to recipient ABC, the Review Time for row 1 indicates that the Review Reminder Time period was exceeded before message 1 was reviewed by ABC, and thus the Review Reminder Record column indicates that a reminder message was sent at the date and time specified.

In this illustrated embodiment, the default options for sending any message is to send the original message to the recipient and to continue to do so until the entry is removed from the Message Tracking Table. However, Post-Review activities occur only once unless otherwise specified in the Post-Review options. Thus, the Review Reminder Options column for row 1 indicates that the reminder message sent was message 1 sent to recipient ABC (since no alternative message or recipient was specified), but that the reminder message was identified as being highly urgent. Since the Review Time column indicates that the original message was reviewed before the Review Reminder Time period had expired a second time, only a single reminder message was sent (as is shown in the Review Reminder Record column). Finally, the Post-Review Time column indicates that after one hour has elapsed from the Review Time, the activity specified by the Post-Review Options should be performed. The Post-Review Options column indicates that Message Y is to be sent, with the recipient defaulting to recipient ABC. After that action has been taken, as indicated by the Post-Review Record, row 1 is ready to be deleted from the Message Tracking Table because all actions related to that row have been performed.

Row 2 of the table indicates that message 1 was resent to recipient BCD two times, with the Resend Options for row 2 indicating that message 1 was to be resent a maximum of 3 times. Since the Review Time for row 2 occurred in less than the Review Reminder Time period, a reminder message was not sent for row 2. The Review Reminder Options for row 2 indicate that were a reminder message to be sent, template X would have been used to create the reminder message. For example, template X may have indicated that "RE:" be added to the subject line of the original message, and that a one line reminder statement be added to the beginning of the body of the original message. Since message 1 has been reviewed by recipient BCD and no Post-Review Time period has been specified, row 2 is also ready to be deleted from the Message Tracking Table.

Row 3 indicates that message 2 was sent to recipient CDE. The lack of a Resend Time period specified for row 3 indicates that delivery notification was not requested by the sender of message 2. While the Review Reminder Time period indicates that notification of the Review Time was requested, the review of the message occurred within the time period and thus no review reminder messages were sent. The Review Reminder Options indicate that had a reminder message been sent, the message would have been sent to the supervisor of recipient CDE so that the supervisor could prompt CDE to read message 2. The supervisor could have been identified directly by the sender of message 2, or the Message Tracking Table Processor may have access to such information from another source. The Post-Review Time and Post-Review Options for row 3 indicate that one day after message 2 was reviewed, an additional message based on template R is to be sent, and that one day later, a message based on template S is to be sent. The Post-Review Records indicate that these actions have taken place. Thus, since all actions have been performed for row 3, row 3 is ready to be deleted from the Message Tracking Table.

Row 4 indicates that message 3 is to be sent to recipient ABC. The Delivery Time and Resend Time periods indicate that message 3 was received by recipient ABC within the Resend Time period, so no resends of message 3 to recipient ABC occurred. Since no Review Reminder Time period was specified, the sender of message 3 did not request notification of when message 3 was reviewed. Thus, since no Review Time was entered for row 4 and no Post-Review Time period or Options were specified, row 4 is ready to be deleted since all of its specified actions have been performed.

Those skilled in the art will appreciate that Message Tracking Table 127 is merely illustrative. A Message Tracking Table could contain additional columns (e.g., a flag column to indicate that a row has been completely processed), or may lack some of the displayed columns. In addition, a single row could be created for each message, with the row removed or flagged only when all activities for all recipients of the message have been performed. In addition, if messages are stored on the server computer system rather than on recipient computer systems, the Message Tracking Table could include one or more columns to indicate when it is safe to delete the message from the server. For example, if all recipients have reviewed the message and none wish to save the message, the message could be safely deleted. Alternately, even if some recipients have not received or reviewed the message, it may be appropriate to delete the message after a specified time period has elapsed.

Figure 3A:
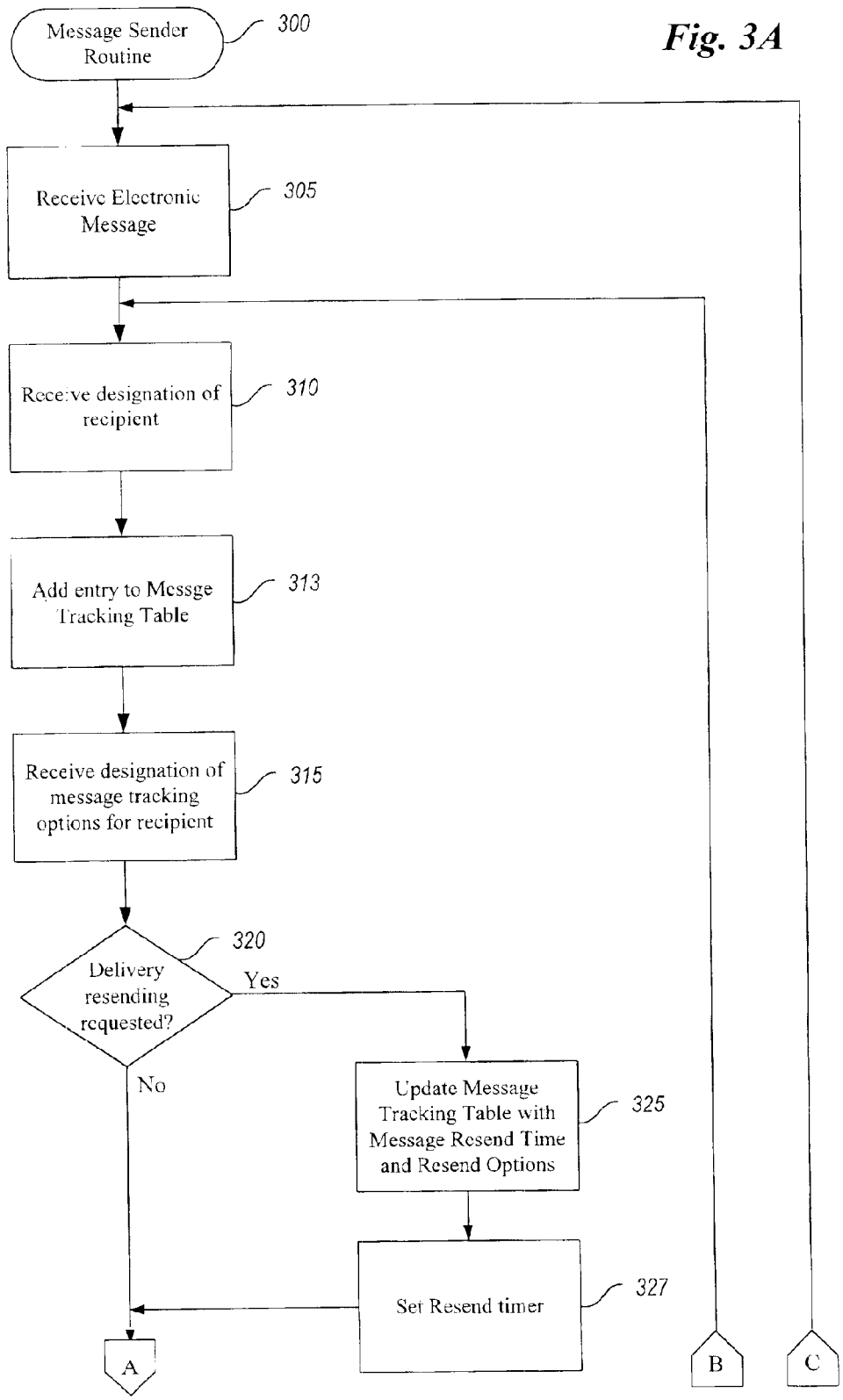
FIGS. 3A and 3B are an exemplary flow diagram of an embodiment of the Message Sender routine.
Figure 3B:
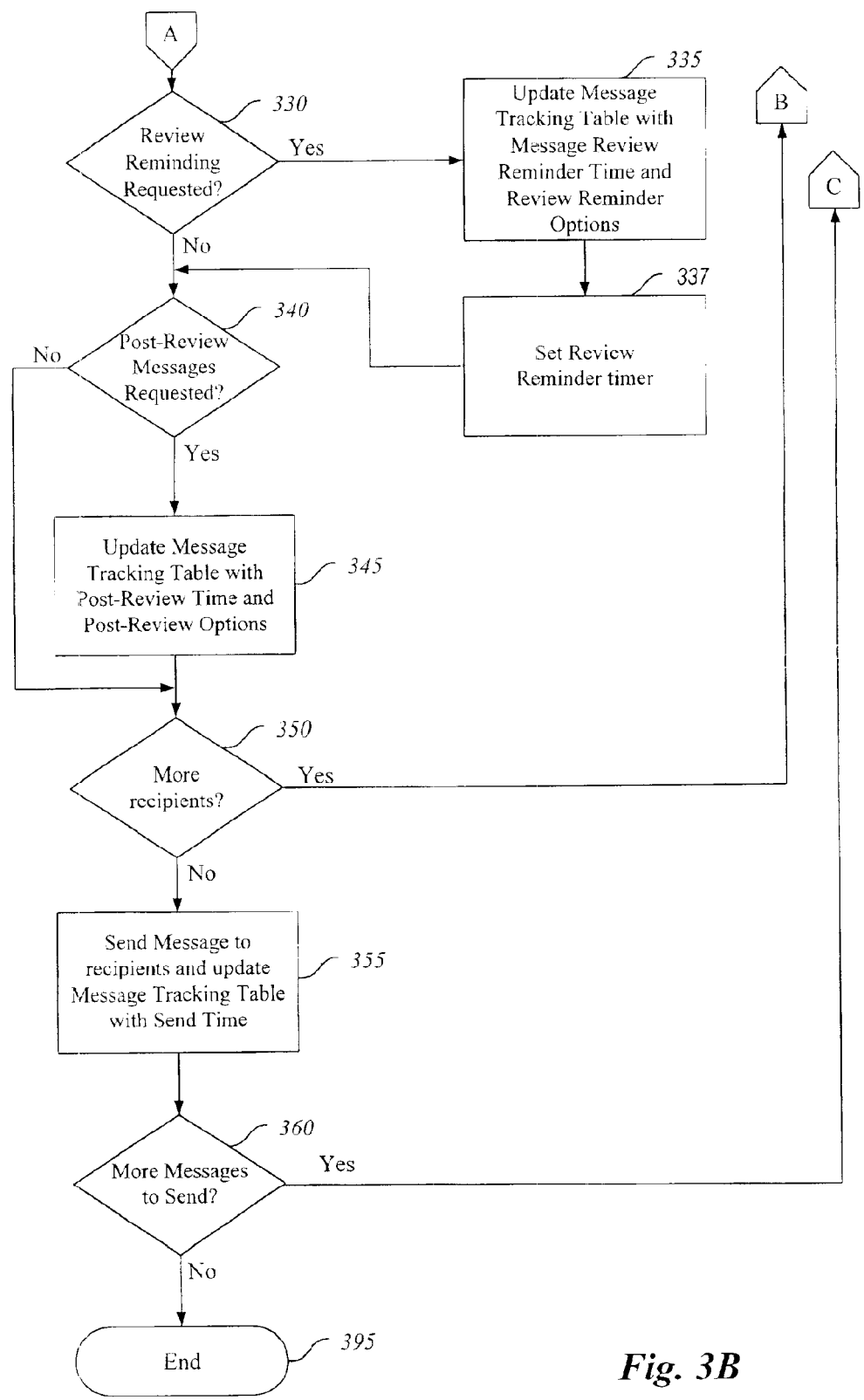

FIGS. 3A and 3B are an exemplary flow diagram of an embodiment of the Message Sender routine 300. The Message Sender routine receives an electronic message to be sent to one or more recipients, receives message tracking information for the recipients, sends the message to the recipients, adds an entry in a Message Tracking Table for each recipient, stores the message tracking information for each recipient and the send time of the message in the recipient's entry, and sets Resend and Review Reminder Timers for each recipient if the sender has specified that the MRS system is to enhance the reliability that the message to that recipient is delivered and is reviewed, respectively. In the illustrated embodiment, the electronic messages being sent are emails which are to be read by the recipients, and each recipient can have different message tracking information. In addition, entries are removed from the Message Tracking Table after all activities have been performed for that entry.

The routine begins at step 305 where an electronic message to be sent is received from a sender. The routine continues at step 310 to receive a designation of a recipient for the electronic message. The routine continues at step 313 to add an entry to the Message Tracking Table for the designated recipient. In step 315, the routine then receives a designation of message tracking information for the recipient from the sender. The message tracking information can include information such as whether the reliability of the delivery and the review of the message are to be enhanced, and if so, time periods for each after which the original message will be resent or a reminder message will be sent if notification of the delivery or review respectively has not been received. In addition, the sender can specify options that indicate how and to whom the original and reminder messages are to be sent. The sender can also specify activity to occur after review of the message by the recipient, such as sending a follow-up message or executing a function after a specified period of time has elapsed. In an alternate embodiment, the MRS system could calculate or use default information for some of the message tracking information. For example, historical data could indicate that delivery of messages to a particular recipient often fail, so a short Resend Time period should be used. Similarly, historical data could indicate that another recipient often needs multiple reminder messages before the original message is reviewed, so the Review Reminder Options could be automatically selected to reflect this information.

After step 315, the routine continues to step 320 to determine if the sender has requested that the delivery reliability of the message be enhanced. If so, the routine continues at step 325 to update the Message Tracking Table with the specified message Resend Time and with any specified Resend Options. The routine then continues at step 327 to set a Resend timer for this recipient that will begin when the message is sent. After step 327, or if it was determined in step 320 that the delivery reliability of the message was not to be enhanced, the routine continues at step 330 to determine if the review reliability for the message is to be enhanced. If so, the routine continues at step 335 to update the Message Tracking Table entry with the specified Review Reminder Time for the message as well as any specified Review Reminder Options. The routine then continues at step 337 to set a Review Reminder Timer for the recipient that will begin when the message is sent.

After step 337, or if it was determined in step 330 that the reliability of the message review was not to be enhanced, the routine continues at step 340 to determine if any post-review activities were requested by the sender. In the illustrated embodiment, post-review activity involves the sending of electronic messages. Those skilled in the art will appreciate that any executable activity could be performed in the same manner. If it is determined in step 340 that a post-review sending of a message is requested, the routine continues at step 345 to update the Message Tracking Table with the specified Post-Review Time period for the message as well as any Post-Review Options. After step 345, or if it was determined in step 340 that no post-review messages were requested, the routine continues at step 350 to determine if there are more recipients to be specified for the received electronic message. If so, the routine returns to step 310, and if not, the routine continues to step 355. In step 355, the routine sends the message to the designated recipient and updates the Message Tracking Table with the send time for the message. Any timers which were set will now begin a countdown. After step 355, the routine continues at step 360 to determine if there are more messages to send. If so, the routine returns to step 305, and if not, the routine ends at step 395. Those skilled in the art will appreciate that the routine could instead receive a single set of message tracking information for all recipients of a message, thus creating a single entry in the Message Tracking Table for each message. In addition, all recipients and message tracking information could be specified at a single time, and the message could be sent to all Recipients at the same time.

Figure 4:
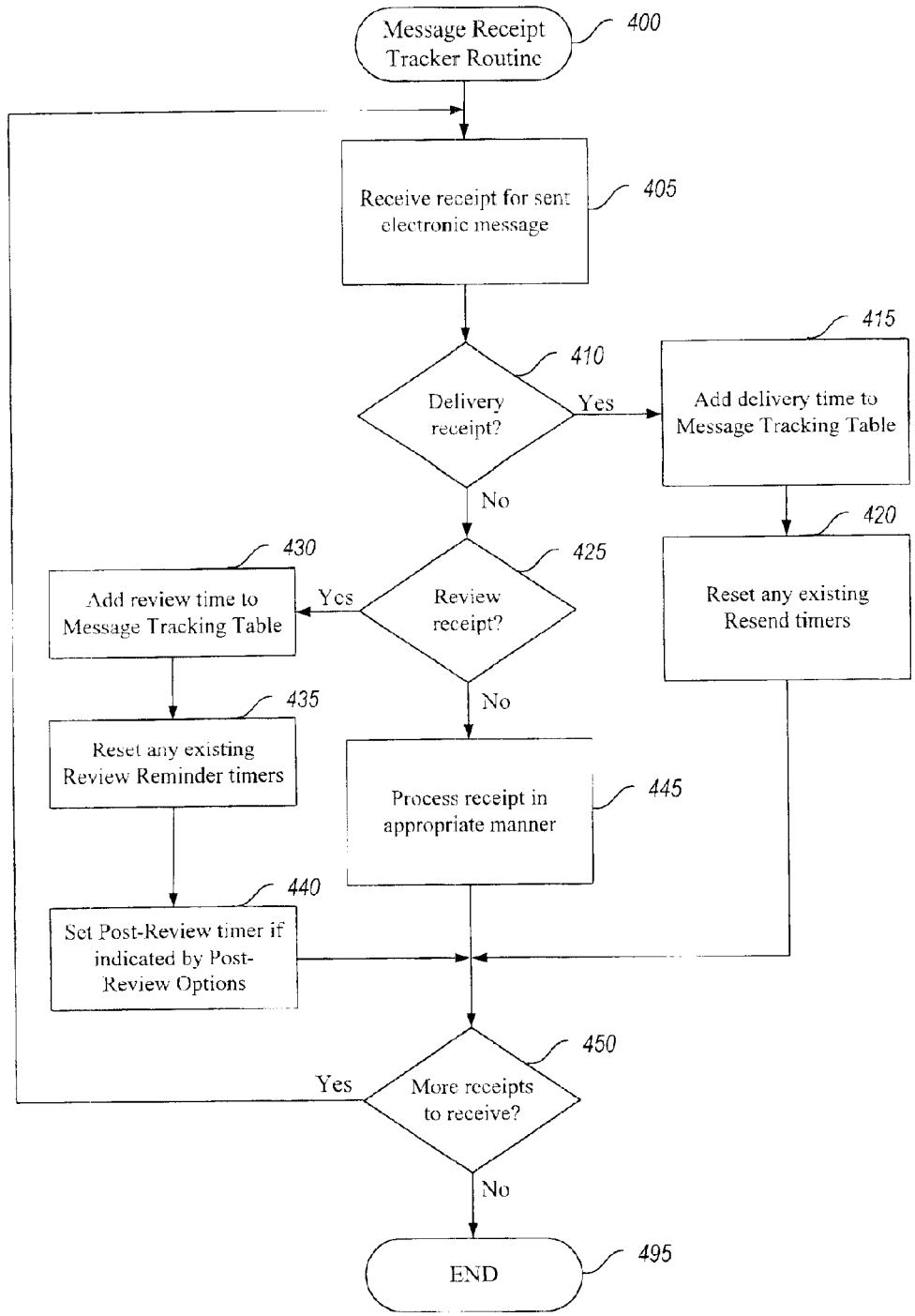
FIG. 4 is an exemplary flow diagram of an embodiment of the Message Receipt Tracker routine.

FIG. 4 is an exemplary flow diagram of an embodiment of the is Message Receipt Tracker routine 400. The Message Receipt Tracker routine receives notifications (in the illustrated embodiment, receipts) related to sent electronic messages (e.g., that a message was delivered or reviewed), adds the appropriate information from the notifications to the Message Tracking Table, resets any existing timers related to the notifications, and sets a Post-Review timer after receiving a review notification if needed for the corresponding message and recipient. The routine begins at step 405 where a receipt for a sent electronic message is received. The routine continues at step 410 to determine if the receipt is a delivery receipt that indicates the message was received by the recipient. If so, the routine continues at step 415 to add the delivery time from the receipt to the entry in the Message Tracking Table corresponding to the message and the recipient. The routine then continues at step 420 to reset any existing Resend timers for this message and recipient.

If it was instead determined in step 410 that the receipt was not a delivery receipt, the routine continues at step 425 to determine if the receipt is a review receipt. If so, the routine continues at step 430 to add the Review Time from the review receipt to the entry in the Message Tracking Table corresponding to the message and the recipient. The routine then continues at step 435 to reset any existing Review Reminder Timers. The routine at step 440 then determines if any Post-Review activities (in the illustrated embodiment, the sending of messages) have been specified for this message and recipient, and if so sets a Post-Review timer corresponding to the Post-Review Options specified in the Message Tracking Table.

If it was instead determined in step 425 that the receipt is not a review receipt, the routine continues in step 445 to process the receipt in the appropriate manner, such as by adding appropriate information to an entry in the Message Tracking Table. For example, if a resent message or a reminder message requested a delivery or review receipt, this information could, in some embodiments, be included in the Message Tracking Table. After step 420, 440, or 445, the routine continues at step 450 to determine if there are more receipts to receive. If so, the routine returns to step 405, and if not the routine ends at step 495.

Figure 5A:
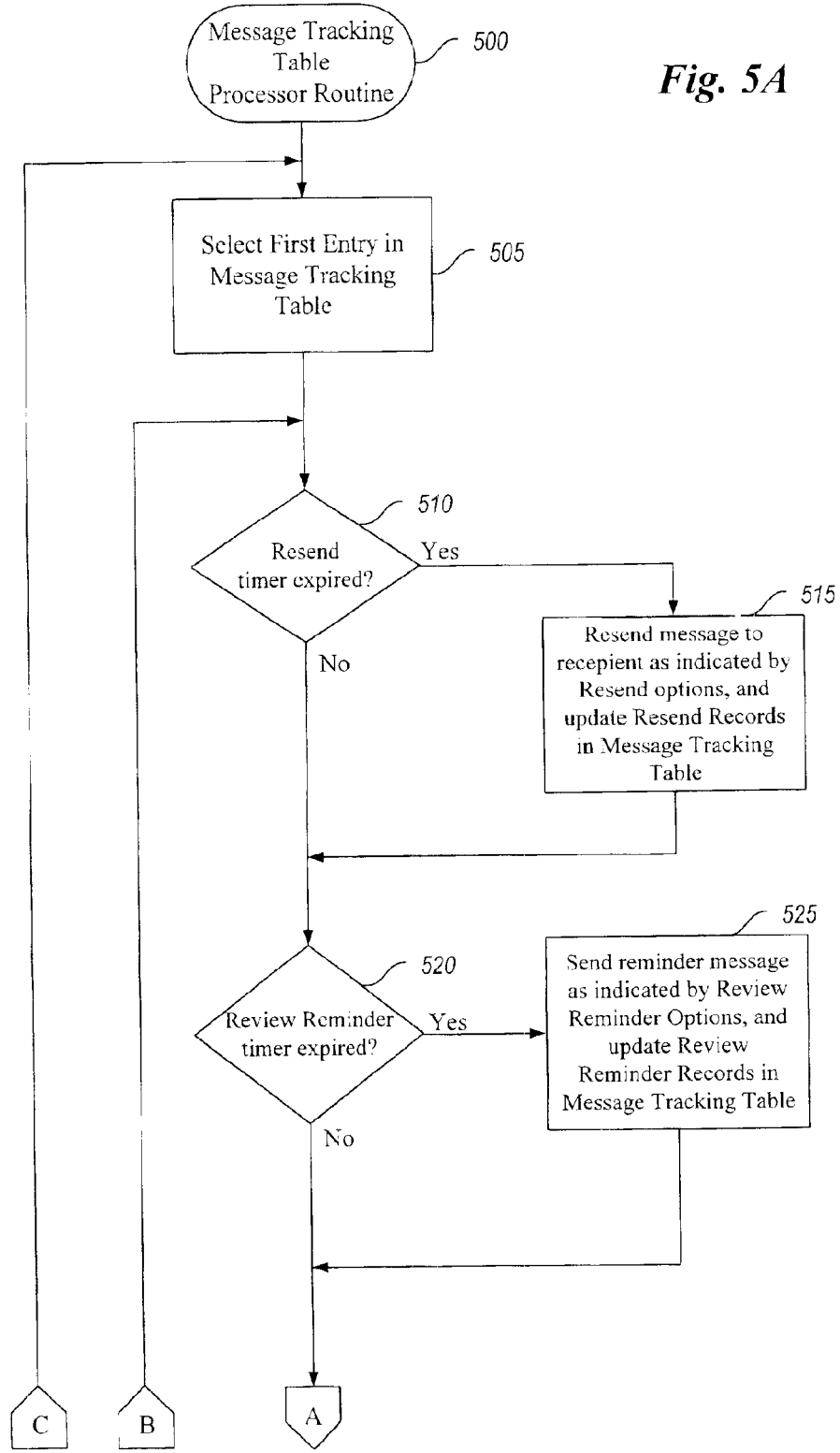
FIGS. 5A and 5B are an exemplary flow diagram of an embodiment of the Message Tracking Table Processor routine.
Figure 5B:
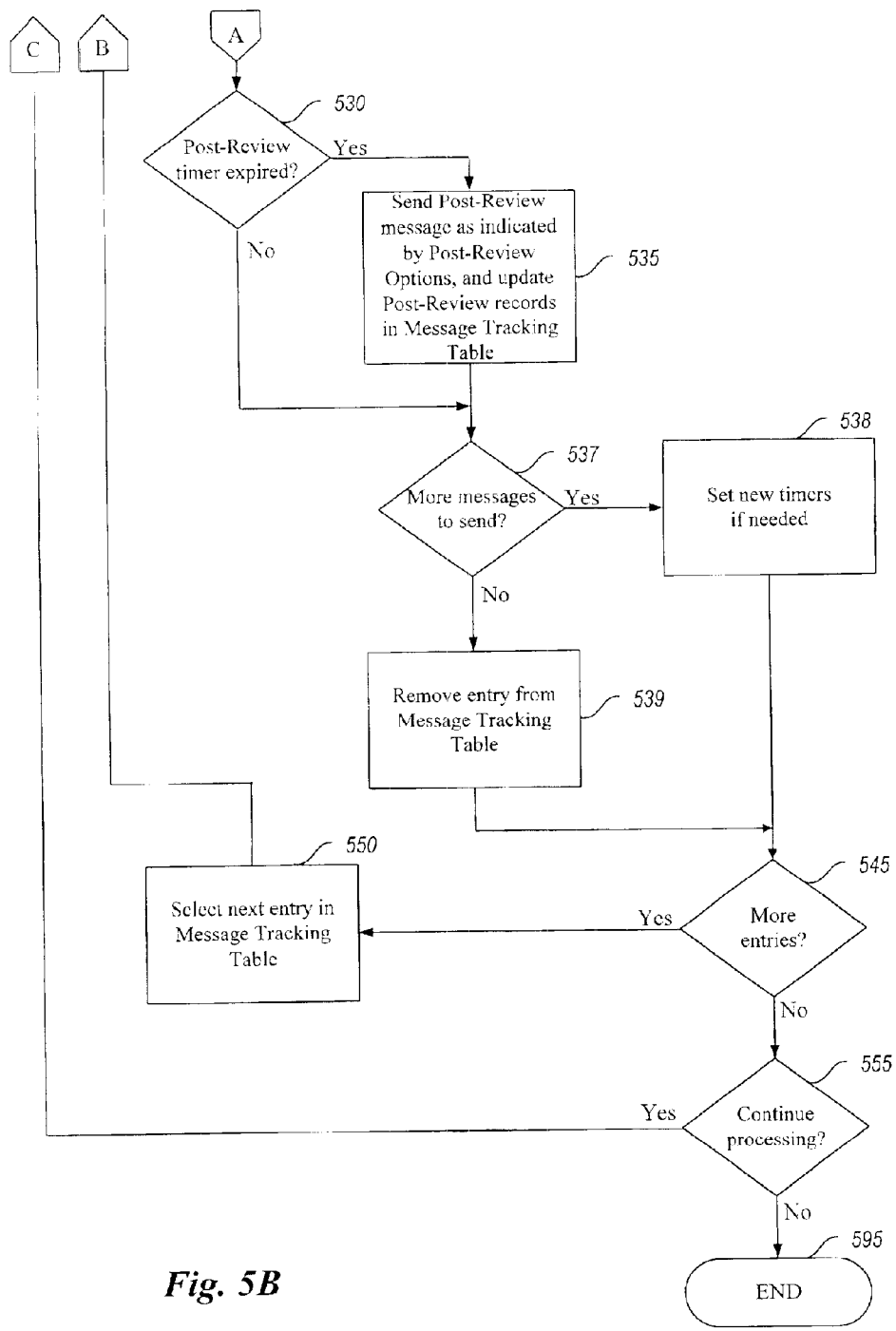

FIGS. 5A and 5B are an exemplary flow diagram of an embodiment of the Message Tracking Table Processor routine 500. The Message Tracking Table Processor routine periodically processes the entries in the Message Tracking Table, and determines for each entry if any specified time periods have expired. If so, the routine automatically takes the appropriate action, such as resending an original message or sending a reminder message. Alternately, in some embodiments sender-specified or default information can instruct the routine to request confirmation from the sender before taking activity such as resending a message or sending a reminder message. In addition, after a time period expires, the routine sets new timers if the time period-continues to apply, and removes entries from the Message Tracking Table after all specified actions have been performed.

The routine begins at step 505 where the first entry in the Message Tracking Table is selected. The routine continues at step 510 to determine if the Resend Time period has expired since the last time the message was resent, or if it has not yet been resent, since the original sending of the message. If the time period has expired, the routine continues at step 515 to resend the message to the recipient as indicated by the Resend Options. The routine then updates the Resend Records in the Message Tracking Table to include the date and time that the original message was resent.

After step 515, or if it was determined in step 510 that the Resend Time period had not expired, the routine continues at step 520 to determine if the Review Reminder Time period has expired. If so, the routine continues at step 525 to send a reminder message as indicated by the Review Reminder Options. The routine also updates the Review Reminder Records in the Message Tracking Table to reflect the date and time that the reminder message was sent. After step 525, or if it was instead determined in step 520 that the Review Reminder Time period had not expired, the routine continues at step 530 to determine if a Post-Review Time period has expired. If so, the routine continues at step 535 to send a post-review message as indicated by the Post-Review Options. The routine also updates the Post-Review Records in the Message Tracking Table to include the date and time that the post-review message was sent.

After step 535, or it was instead determined in step 530 that the Post-Review Time period has not expired, the routine continues at stop 537 to determine if additional activities (e.g., continuing to resend the original message or sending additional reminder or post-review messages) need to be performed for the message and recipient specified in the current entry. For example, if any timers are still pending for this entry or if the timer that just expired needs to be reset, additional activities may need to be performed for this entry. However, if all activities are completed for this entry, the routine continues at step 539 to remove the entry from the Message Tracking Table. If it is instead determined in step 537 that there may be additional activities (e.g., additional messages to be sent), the routine instead continues in step 538 to set a new timer for the one or more time periods that have just expired.

After step 538 or 539, the routine continues at step 545 to determine if there are more entries in the Message Tracking Table. If so, the routine continues at step 550 to select the next entry in the Message Tracking Table, and then returns to step 510. If it was instead determined in step 535 that there are not more entries in the Message Tracking Table, the routine continues at step 555 to determine whether to continue processing the Message Tracking Table from the beginning. If so, the routine returns to step 505, and if not the routine ends at step 595.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a computer system for a sender of an electronic message to ensure that the electronic message is delivered to and reviewed by intended recipient users, the method comprising:

composing the electronic message;

indicating a plurality of intended recipient users;

selecting a delivery recipient user from the intended recipient users;

selecting a review recipient user from the intended recipient users;

sending the electronic message to the plurality of intended recipient users;

requesting from the delivery recipient user a delivery notification when the electronic message is delivered to the delivery recipient user;

requesting from the review recipient user a review notification when the review recipient user reviews the electronic message;

determining a delivery waiting period for receiving the delivery notification;

selecting a delivery time interval corresponding to the delivery waiting period;

determining a review waiting period for receiving the review notification and selecting a review time interval corresponding to the review waiting period; and without user intervention,
when the delivery notification from the delivery recipient user is not received by the sender within the selected delivery time interval corresponding to the delivery waiting period, resending the electronic message to the delivery recipient user; and
when the review notification from the review recipient user is not received by the sender within the selected review time interval corresponding to the review waiting period, sending a second electronic message to the review recipient user.

2. The method of claim 1 wherein multiple delivery recipient users and multiple review recipient users are selected, wherein the resending is performed for each delivery recipient user when a delivery notification for that delivery recipient user is not received by the sender within the delivery waiting period, and wherein the sending of the second electronic message is performed for each review recipient user when a review notification for that review recipient user is not received by the sender within the review waiting period.

3. The method of claim 1 wherein the sent second electronic message is distinct from the sent electronic message, wherein the sent electronic message indicated a priority level for review of the sent electronic message, and wherein the sent second electronic message indicates an elevated priority level for review of the sent second electronic message.

4. The method of claim 1 including:

determining a user responsible for delivery of electronic messages; and when the delivery notification for the delivery recipient user is not received by the sender within the delivery waiting period, sending an electronic message to the determined user.

5. The method of claim 1 including:

determining a user able to prompt review of the sent electronic message by the review recipient user; and when the review notification for the review recipient user is not received by the sender within the review waiting period, sending an electronic message to the determined user to prompt review of the sent electronic message by the review recipient user.

6. A method in a computer system for delivery of an electronic message, the method comprising:

determining whether after sending of the electronic message to a plurality of recipients a user-specified period of time has elapsed without receiving a confirmation of delivery of the electronic message to each recipient; and when it is determined that the user-specified period of time has elapsed without receiving the confirmation of delivery to the recipient, automatically resending the electronic message.

7. The method of claim 6 wherein the determined period of time for each recipient is based on past performance of delivering electronic messages to that recipient.

8. The method of claim 6 wherein an electronic message can be sent with one of a plurality of priority levels, and wherein the resending of the electronic message is performed with a higher priority level than the sending of the electronic message.

9. The method of claim 6 including requesting of the confirmation of the delivery to the recipient.

10. The method of claim 9 wherein the requesting of the confirmation includes querying the recipient after the sending of the electronic message to determine if the sent electronic message was delivered to the recipient.

11. The method of claim 6 including:
after receiving the confirmation, automatically sending a third electronic message after a second user-specified period of time.

12. The method of claim 6 wherein the resending of the electronic message involves determining a user responsible for delivery of electronic messages and sending to the determined user an electronic message distinct from the sent electronic message.

13. A method in a computer system for delivery of an electronic message, the method comprising:
determining whether after sending of the electronic message to a plurality of recipients a pre-determined period of time has elapsed for each recipient without receiving a confirmation that the recipient reviewed the sent electronic message, the predetermined time period corresponding to a time interval selected by a sender; and
when it is determined that the period of time has elapsed without receiving the confirmation, sending another electronic message, wherein the sending of the another message is performed automatically for each recipient when the period of time for that recipient has elapsed without receiving a confirmation for that recipient.

14. The method of claim 13 including requesting the confirmation.

15. The method of claim 13 including monitoring review of electronic messages by the recipient to determine when the recipient reviews the sent electronic message.

16. The method of claim 15 wherein the monitoring of the review includes:
detecting when the recipient accesses the sent electronic message; and
monitoring user interaction with the accessed electronic message to determine if review of the accessed electronic message has occurred.

17. The method of claim 13 wherein the determined period of time for each recipient is based on past performance of the recipient in reviewing electronic messages sent to that recipient.

18. The method of claim 13 wherein the electronic message can be sent with one of a plurality of urgency levels indicating an urgency to review the electronic message, and wherein the sending of the another electronic message includes a higher urgency level than the sending of the electronic message.

19. The method of claim 13 wherein the another electronic message is a reminder message sent to the recipient, the reminder message distinct from the sent electronic message.

20. The method of claim 13 wherein the another electronic message includes the electronic message, and wherein the sent another electronic message indicates an elevated priority that the sent another electronic message be reviewed.

21. The method of claim 13 wherein the another electronic message is sent to a second recipient distinct from the recipient, and wherein the another electronic message prompts the second recipient to facilitate review by the recipient of the sent electronic message.

22. The method of claim 13 including:
after receiving the confirmation, automatically sending a third electronic message after a second pre-determined period of time.

23. The method of claim 13 including:
when it is determined that the period of time has elapsed without receiving the confirmation and that the confirmation is not received within a second period of time, automatically sending a third electronic message.

24. The method of claim 13 including setting a timer to expire at the pre-determined period of time after the sending of the electronic message, and wherein the another electronic message is automatically sent when the confirmation is not received before the timer expires.

25. A method for a sender of an electronic message to ensure that the electronic message is reviewed by a recipient, the computer-implemented method comprising:
determining whether after sending of a first electronic message to a recipient a sender specified amount of time has elapsed without the sender receiving at least one of a first confirmation that the electronic message has been received by the recipient and an indication that the recipient reviewed the sent electronic message;
when it is determined that the period of time has elapsed without receiving the first confirmation or the indication,
automatically requesting a second confirmation from the sender to send a second electronic message to the recipient, which is the same as the first electronic message; and
when the confirmation is received from the sender, automatically sending the second electronic message to the recipient.

26. The method of claim 25 wherein the electronic message is sent to a plurality of recipients, and including receiving a specification of an amount of time for each recipient such that the automatic requesting of the second confirmation is performed for each recipient when an indication that the sent electronic message was reviewed by that recipient is not received within the specified amount of time for that recipient.

27. The method of claim 25 wherein the requesting of the second confirmation includes graphically presenting to the sender a request to send the second electronic message, the request including a selectable confirmation element such that selection of the confirmation element indicates the confirmation from the sender.

28. The method of claim 25 including:
when it is determined that the period of time has elapsed without receiving the first confirmation or indication that the resent message has been reviewed, automatically requesting a third confirmation from the sender to send a third electronic message if the first confirmation or indication is not received within a second amount of time.

29. A computer-readable medium containing instructions for controlling a computer system to deliver an electronic message, by:

determining whether after sending of the electronic message to a plurality of recipients a predetermined period of time specified for each recipient has elapsed without receiving a confirmation that the recipient reviewed the sent electronic message, the predetermined time period corresponding to a time interval selected by a sender; and when it is determined that the period of time has elapsed without receiving the confirmation, sending another electronic message, wherein the sending of the another message is performed automatically for each recipient when the period of time for that recipient has elapsed without receiving the confirmation for that recipient.

30. The computer-readable medium of claim 29 wherein the another electronic message is a reminder message sent to the recipient, the reminder message distinct from the sent electronic message.

31. The computer-readable medium of claim 29 wherein the computer system is further controlled by:

when the confirmation is not received within the predetermined amount of time, determining a second amount of time; and when the confirmation is not received within the determined second amount of time, automatically sending a third electronic message.

32. A computer system for ensuring that an electronic message is reviewed by a recipient, comprising:

a message sender for receiving an indication of the recipient for the electronic message and for sending the electronic message to the recipient;

a message tracker for determining whether the recipient within a message sender specified amount of time has reviewed the electronic message sent by the message sender; and a message processor for automatically sending another electronic message to the recipient when it is determined that the message sender specified amount of time has elapsed without the recipient having reviewed the electronic message.

33. The computer system of claim 32 wherein the message processor is further configured for receiving indications of a plurality of recipients for the electronic message and for receiving a specification of an amount of time for each recipient, wherein the message tracker is further configured for determining for each of the recipients whether the sent electronic message was reviewed by that recipient within the specified amount of time for that recipient, and wherein the message processor is further configured for sending the another message for each recipient for which the message tracker determines that that recipient did not review the sent electronic message within the specified amount of time for that recipient.

34. The computer system of claim 32 wherein the message processor is further configured for determining a second message sender specified amount of time whether the another message has been reviewed by the recipient and for automatically sending a third electronic message to the recipient when the another message has not been reviewed within the second message sender specified amount of time.

35. A method in a computer system for delivery of an electronic message, the method comprising:

determining whether after sending of the electronic message to a plurality of recipients a user-specified period of time has elapsed without receiving a confirmation of delivery of the electronic message to each recipient, wherein the determined period of time for the recipient is based on past performance of delivering electronic messages to that recipient; and when it is determined that the user-specified period of time has elapsed without receiving the confirmation of delivery to the recipient, automatically resending the electronic message.

36. The method of claim 35 wherein an electronic message can be sent with one of a plurality of priority levels, and wherein the resending of the electronic message is performed with a higher priority level than the sending of the electronic message.

37. The method of claim 35 including requesting of the confirmation of the delivery to the recipient.

38. The method of claim 37 wherein the requesting of the confirmation includes querying the recipient after the sending of the electronic message to determine if the sent electronic message was delivered to the recipient.

39. The method of claim 35 including:

after receiving the confirmation, automatically sending a third electronic message after a second user-specified period of time.

40. The method of claim 35 wherein the resending of the electronic message involves determining a user responsible for delivery of electronic messages and sending to the determined user an electronic message distinct from the sent electronic message.

41. A method in a computer system for delivery of an electronic message, the method comprising:

determining whether after sending of the electronic message to a recipient a user-specified period of time has elapsed without receiving a confirmation of delivery of the electronic message to the recipient;

when it is determined that the user-specified period of time has elapsed without receiving the confirmation, resending the electronic message; and after receiving the confirmation, automatically sending a third electronic message after a second user-specified period of time.

42. The method of claim 41 wherein the electronic message is sent to a plurality of recipients, wherein a period of time is determined for each recipient, and wherein the resending of the message is performed automatically for each recipient when the period of time for that recipient has elapsed without receiving a confirmation of delivery to that recipient.

43. The method of claim 41 wherein the determined period of time for each recipient is based on past performance of delivering electronic messages to that recipient.

44. The method of claim 41 wherein an electronic message can be sent with one of a plurality of priority levels, and wherein the resending of the electronic message is performed with a higher priority level than the sending of the electronic message.

45. The method of claim 41 including requesting of the confirmation of the delivery to the recipient.

46. The method of claim 45 wherein the requesting of the confirmation includes querying the recipient after the sending of the electronic message to determine if the sent electronic message was delivered to the recipient.

47. The method of claim 41 wherein the resending of the electronic message involves determining a user responsible for delivery of electronic messages and sending to the determined user an electronic message distinct from the sent electronic message.

48. A method in a computer system for delivery of an electronic message, the method comprising:

determining whether after sending of the electronic message to a plurality of recipients a pre-determined period of time has elapsed for each recipient without receiving a confirmation that the recipient reviewed the sent electronic message, the predetermined time period corresponding to a time interval selected by a sender, wherein the predetermined period of time for each recipient is based on past performance of the recipient in reviewing electronic messages sent to that recipient; and when it is determined that the period of time has elapsed without receiving the confirmation, sending another electronic message, wherein the sending of the another message is performed automatically for each recipient when the period of time for that recipient has elapsed without receiving a confirmation for that recipient.

49. The method of claim 48 including requesting the confirmation.

50. The method of claim 48 including monitoring review of electronic messages by the recipient to determine when the recipient reviews the sent electronic message.

51. The method of claim 50 wherein the monitoring of the review includes:

detecting when the recipient accesses the sent electronic message; and monitoring user interaction with the accessed electronic message to determine if review of the accessed electronic message has occurred.

52. The method of claim 48 wherein the electronic message can be sent with one of a plurality of urgency levels indicating an urgency to review the electronic message, and wherein the sending of the another electronic message includes a higher urgency level than the sending of the electronic message.

53. The method of claim 48 wherein the another electronic message is a reminder message sent to the recipient, the reminder message distinct from the sent electronic message.

54. The method of claim 48 wherein the another electronic message includes the electronic message, and wherein the sent another electronic message indicates an elevated priority that the sent another electronic message be reviewed.

55. The method of claim 48 wherein the another electronic message is sent to a second recipient distinct from the recipient, and wherein the another electronic message prompts the second recipient to facilitate review by the recipient of the sent electronic message.

56. The method of claim 48 including:

after receiving the confirmation, automatically sending a third electronic message after a second pre-determined period of time.

57. The method of claim 48 including:

when it is determined that the period of time has elapsed without receiving the confirmation and that the confirmation is not received within a second period of time, automatically sending a third electronic message.

58. The method of claim 48 including setting a timer to expire at the pre-determined period of time after the sending of the electronic message, and wherein the another electronic message is automatically sent when the confirmation is not received before the timer expires.

59. A method in a computer system for delivery of an electronic message, the method comprising:

determining whether after sending of the electronic message to a recipient a pre-determined period of time has elapsed without receiving a confirmation that the recipient reviewed the sent electronic message, the predetermined time period corresponding to a time interval selected by a sender;

when it is determined that the period of time has elapsed without receiving the confirmation, automatically sending another electronic message.

60. The method of claim 59 including requesting the confirmation.

61. The method of claim 59 including monitoring review of electronic messages by the recipient to determine when the recipient reviews the sent electronic message.

62. The method of claim 61 wherein the monitoring of the review includes:

detecting when the recipient accesses the sent electronic message; and monitoring user interaction with the accessed electronic message to determine if review of the accessed electronic message has occurred.

63. The method of claim 59 wherein the electronic message is sent to a plurality of recipients, wherein a period of time is determined for each recipient, and wherein the sending of the another message is performed automatically for each recipient when the period of time for that recipient, has elapsed without receiving a confirmation for that recipient.

64. The method of claim 59 wherein the determined period of time for each recipient is based on past performance of the recipient in reviewing electronic messages sent to that recipient.

65. The method of claim 59 wherein the electronic message can be sent with one of a plurality of urgency levels indicating an urgency to review the electronic message, and wherein the sending of the another electronic message includes a higher urgency level than the sending of the electronic message.

66. The method of claim 59 wherein the another electronic message is a reminder message sent to the recipient, the reminder message distinct from the sent electronic message.

67. The method of claim 59 wherein the another electronic message includes the electronic message, and wherein the sent another electronic message indicates an elevated priority that the sent another electronic message be reviewed.

68. The method of claim 59 wherein the another electronic message is sent to a second recipient distinct from the recipient, and wherein the another electronic message prompts the second recipient to facilitate review by the recipient of the sent electronic message.

69. The method of claim 59 including:

when it is determined that the period of time has elapsed without receiving the confirmation and that the confirmation is not received within a second period of time after sending the another electronic message, automatically sending a third electronic message to the recipient.

70. The method of claim 59 including setting a timer to expire at the pre-determined period of time after the sending of the electronic message, and wherein the another electronic message is automatically sent when the confirmation is not received before the timer expires.

71. A method in a computer system for delivery of an electronic message, the method comprising:

determining whether after sending of the electronic message to a recipient a pre-determined period of time has elapsed without receiving a confirmation that the recipient reviewed the sent electronic message, the predetermined time period corresponding to a time interval selected by a sender; and when it is determined that the period of time has elapsed without receiving the confirmation, sending another electronic message to the recipient, and if it is determined that-no confirmation is received from the recipient within a second period of time, automatically sending a third electronic message to the recipient.

72. The method of claim 71 including requesting the confirmation.

73. The method of claim 71 including monitoring review of electronic messages by the recipient to determine when the recipient reviews the sent electronic message.

74. The method of claim 73 wherein the monitoring of the review includes:

detecting when the recipient accesses the sent electronic message; and monitoring user interaction with the accessed electronic message to determine if review of the accessed electronic message has occurred.

75. The method of claim 71 wherein the electronic message is sent to a plurality of recipients, wherein a period of time is determined for each recipient, and wherein the sending of the another message is performed automatically for each recipient when the period of time for that recipient has elapsed without receiving a confirmation for that recipient.

76. The method of claim 75 wherein the determined period of time for each recipient is based on past performance of the recipient in reviewing electronic messages sent to that recipient.

77. The method of claim 75 wherein the electronic message can be sent with one of a plurality of urgency levels indicating an urgency to review the electronic message, and wherein the sending of the another electronic message includes a higher urgency level than the sending of the electronic message.

78. The method of claim 71 wherein the another electronic message is a reminder message sent to the recipient, the reminder message distinct from the sent electronic message.

79. The method of claim 71 wherein the another electronic message includes the electronic message, and wherein the sent another electronic message indicates an elevated priority that the sent another electronic message be reviewed.

80. The method of claim 71 wherein the another electronic message is sent to a second recipient distinct from the recipient, and wherein the another electronic message prompts the second recipient to facilitate review by the recipient of the sent electronic message.

81. The method of claim 71 including setting a timer to expire at the pre-determined period of time after the sending of the electronic message, and wherein the another electronic message is automatically sent when the confirmation is not received before the timer expires.

82. A method in a computer system for delivery of an electronic message, the method comprising:

determining whether after sending of the electronic message to a recipient a pre-determined period of time has elapsed without receiving a confirmation that the recipient reviewed the sent electronic message, the predetermined time period corresponding to a time interval selected by a sender;

setting a timer to expire at the pre-determined period of time after the sending of the electronic message; and when it is determined that the period of time has elapsed without receiving the confirmation, sending another electronic message, wherein the another electronic message is automatically sent when the confirmation is not received before the timer expires.

83. The method of claim 82 including requesting the confirmation.

84. The method of claim 83 including monitoring review of electronic messages by the recipient to determine when the recipient reviews the sent electronic message.

85. The method of claim 84 wherein the monitoring of the review includes:

detecting when the recipient accesses the sent electronic message; and monitoring user interaction with the accessed electronic message to determine if review of the accessed electronic message has occurred.

86. The method of claim 82 wherein the electronic message is sent to a plurality of recipients, wherein a period of time is determined for each recipient, and wherein the sending of the another message is performed automatically for each recipient when the period of time for that recipient has elapsed without receiving a confirmation for that recipient.

87. The method of claim 86 wherein the determined period of time for each recipient is based on past performance of the recipient in reviewing electronic messages sent to that recipient.

88. The method of claim 82 wherein the electronic message can be sent with one of a plurality of urgency levels indicating an urgency to review the electronic message, and wherein the sending of the another electronic message includes a higher urgency level than the sending of the electronic message.

89. The method of claim 82 wherein the another electronic message is a reminder message sent to the recipient, the reminder message distinct from the sent electronic message.

90. The method of claim 82 wherein the another electronic message includes the electronic message, and wherein the sent another electronic message indicates an elevated priority that the sent another electronic message be reviewed.

91. The method of claim 82 wherein the another electronic message is sent to a second recipient distinct from the recipient, and wherein the another electronic message prompts the second recipient to facilitate review by the recipient of the sent electronic message.

92. The method of claim 82 including:

after receiving the confirmation, automatically sending a third electronic message after a second pre-determined period of time.

93. The method of claim 82 including:

when it is determined that the period of time has elapsed without receiving the confirmation and that the confirmation is not received within a second period of time, automatically sending a third electronic message.

94. A computer-readable medium containing instructions for controlling a computer system to deliver an electronic message, by:

determining whether after sending of the electronic message to a recipient a pre-determined period of time has elapsed without receiving a confirmation that the recipient reviewed the sent electronic message, the predetermined time period corresponding to a time interval selected by a sender;

when it is determined that the period of time has elapsed without receiving the confirmation, sending another electronic message;

when the confirmation is not received within the predetermined amount of time, determining a second amount of time; and when the confirmation is not received within the determined second amount of time, automatically sending a third electronic message.

95. The computer-readable medium of claim 94 wherein the electronic message is sent to a plurality of recipients, wherein a period of time is specified for each recipient, and wherein the sending of the another message is performed automatically for each recipient when the period of time for that recipient has elapsed without receiving the confirmation for that recipient.

96. The computer-readable medium of claim 94 wherein the another electronic message is a reminder message sent to the recipient, the reminder message distinct from the sent electronic message.

* * * * *

UNITED STATES PATENT AND TRADEMARK OFFICE
CERTIFICATE OF CORRECTION

PATENT NO. : 6,854,007 B1  Page 1 of 1
APPLICATION NO. : 09/153994
DATED : February 8, 2005
INVENTOR(S) : Nancey J. Hammond It is certified that error appears in the above-identified patent and that said Letters Patent is hereby corrected as shown below:

| Column, Line | Reads | Should Read |
|---|---|---|
| Column 1, Line 16 | "electronic-message," | --electronic message,-- |
| Column 1, Line 59 | "if it desirable" | --if is desirable-- |
| Column 2, Line 48 | "reviewed by to each" | --reviewed by each-- |
| Column 3, Line 21 | "for a week in addition," | --for a week. In addition,-- |
| Column 6, Line 51 | "a singe server" | --a single server-- |
| Column 10, Line 4 | "sent to all Recipients" | --sent to all recipients-- |
| Column 10, Line 48 | "FIGS. 5A and 5B are an exemplary flow digram" | --FIGS. 5A and 5B are exemplary flow diagrams-- |
| Column 11, Line 22 | "or it was instead" | --or if it was instead-- |
| Column 18, Line 25 | "period of time for that receipient," | --period of time for that recipient-- |
| Column 19, Line 8 | "that-no confirmation" | --that no confirmation-- |
| Column 20, Line 8 | "84. The method of claim 83" | --84. The method of claim 82-- |

Signed and Sealed this

Twenty-sixth Day of December, 2006

JON W. DUDAS
*Director of the United States Patent and Trademark Office*